United States Patent
Hsu et al.

(10) Patent No.: US 7,280,179 B2
(45) Date of Patent: Oct. 9, 2007

(54) LIQUID CRYSTAL DISPLAY CELL AND METHOD FOR MANUFACTURING THE SAME

(75) Inventors: Hsin-Yi Hsu, Tainan County (TW); Shang-Tai Tsa, Tainan County (TW)

(73) Assignee: CHI MEI Optoelectronics Corp., Tainan County (TW)

( * ) Notice: Subject to any disclaimer, the term of this patent is extended or adjusted under 35 U.S.C. 154(b) by 113 days.

(21) Appl. No.: 10/921,508

(22) Filed: Aug. 19, 2004

(65) Prior Publication Data

US 2005/0094084 A1    May 5, 2005

(30) Foreign Application Priority Data

Nov. 3, 2003    (TW) .............................. 92130636 A

(51) Int. Cl.
    *G02F 1/1339* (2006.01)
(52) U.S. Cl. ....................... 349/153; 349/190; 349/187
(58) Field of Classification Search ................ 349/153, 349/190, 187, 189
    See application file for complete search history.

(56) References Cited

U.S. PATENT DOCUMENTS 6,674,507 B2 *   1/2004   Yoshizoe .................... 349/190
6,822,725 B2 *  11/2004   Choo et al. ................. 349/187
2002/0012094 A1 * 1/2002  Suzuki ....................... 349/153

FOREIGN PATENT DOCUMENTS

JP    2002122870    4/2002

* cited by examiner

*Primary Examiner*—David Nelms
*Assistant Examiner*—(Nancy) Thanh-Nhan Nguyen
(74) *Attorney, Agent, or Firm*—Thomas, Kayden, Hortemeyer & Risley

(57) ABSTRACT

A liquid crystal display cell and a method for manufacturing the same are disclosed. The method includes the following steps. First, a sealing member including a main portion enclosing a display region and a protrusion part extending from the main portion is formed. Then, a liquid crystal material is dispensed upon one of a pair of substrates, and then one substrate is superposed upon the other substrate so as to perform alignment and assembly processes. After the sealing member is cured, the pair of substrates is cut thereby obtaining the liquid crystal display cell. The sealing member is formed by starting application of a sealing material to either one of a pair of substrates from a position outside of the display region toward the display region to form the protrusion part of the sealing member, and continuing the application of the sealing material along the display region to form the main portion of the sealing member.

19 Claims, 5 Drawing Sheets

LIQUID CRYSTAL DISPLAY CELL AND METHOD FOR MANUFACTURING THE SAME

BACKGROUND OF THE INVENTION

1. Field of the Invention

The present invention generally relates to a liquid crystal display device, and more particularly relates to a liquid crystal display device manufactured by one drop fill (ODF) process and a method for manufacturing the same.

2. Description of the Related Art

Generally, conventional liquid crystal display (LCD) devices include a light source and a LCD cell and control the transmission of light by utilizing the birefringence characteristic of liquid crystal thereby displaying variety of images. In a process of making LCD panels, two substrates are generally assembled together as a cell by a sealing material with only an injection hole left thereof, and then a liquid crystal material is injected into the cell gap formed between the two substrates. Finally, the injection hole of the cell is sealed.

There has been a new technique recently provided in which a liquid crystal material is dispensed upon a substrate and the other substrate is covered thereupon. This technique greatly reduces the steps of a process of making LCD panels and improves manufacturing efficiencies. More specifically, the one drop fill (ODF) method includes the following steps. First, a sealant is applied to the whole periphery of one of a pair of substrates so as to form a sealing member and then a liquid crystal material is dispensed upon one of the pair of substrates. After the dispensing step, one substrate is superposed upon the other one and then the sealing member is to be cured. It should be noted that, in this method, a pure thermosetting sealant can not be used in the step of dispensing the liquid crystal material before the two substrates are sealed. Accordingly, the sealant for forming the sealing member is preferably a radiation-curable adhesive (e.g. an ultraviolet-curable adhesive).

Compared to the vacuum injection method widely utilized in making LCD cells, the one drop fill (ODF) method can greatly reduce the manufacturing cost of LCD cells and improve the yield rate due to following reasons. First, the ODF method can reduce the usage amount of liquid crystal material. Secondly, it can also reduce the time for liquid crystal material injection. Therefore, there exists a strong necessity of applying the ODF method to the process of manufacturing LCD cells.

However, in the ODF method, the sealing member formed before the liquid crystal material being dispensed is required to fully enclose a display region of one substrate without leaving any opening thereof. When the sealing member is formed by an application manner, it is designed to have an overlapping segment between the initial end and the final end of the sealant so as to ensure that the formed sealing member can fully enclose the display region. However, the usage amount of the sealant for forming this overlapping segment is generally more than that for forming other parts. Besides, at the beginning of applying the sealant, the applied amount of the sealant is not easily controlled resulting in that the applied amount of the initial end being too large. Therefore, after dispensing the liquid crystal material and superposing the two substrates, the shape of the initial end of the sealant is usually larger than its predetermined size and thus overlapped by a light-shielding matrix of the substrate. Consequently, in the step of curing the sealing member by a radiation (e.g. ultraviolet), the part of the sealant covered (overlapped) by the light-shielding matrix will not be completely cured due to not obtaining rays from the radiation. Further, the uncured part of the sealant will react with the liquid crystal material and thus adversely affect the performance of the liquid crystal material.

Accordingly, in order to ensure that the sealing member can be completely cured so as not to react with the liquid crystal material, the distance between the sealing member and the part of the light-shielding matrix that causes a light-blocking effect should be kept larger. It signifies that the area outside the display region of an LCD panel should be increased or that the area of the display region should be reduced in an LCD panel having a fixed size. However, these significations are apparently not the trend of developing liquid crystal displays.

Accordingly, the present invention provides a liquid crystal display that can overcome or at least improve the above-mentioned problem situations.

SUMMARY OF THE INVENTION

Therefore, it is an object of the present invention to provide a manufacturing method for sealing a liquid crystal material between two substrates by utilizing one drop fill (ODF) process, which can overcome or at least improve the above-mentioned problem situations.

In order to achieve above-mentioned and other objectives, the present invention provides a method for manufacturing liquid crystal display (LCD) cells that comprises the following steps. First, a sealing member including a main portion enclosing a display region and a protrusion part extending from the main portion is formed. Then, a liquid crystal material is dispensed upon one of a pair of substrates, and then one substrate is superposed upon the other substrate so as to perform alignment and assembly processes. After the sealing member is cured, the pair of substrates is cut thereby obtaining the LCD cells. The sealing member is formed by starting application of a sealing material to either one of a pair of substrates from a position outside the display region toward the display region to form the protrusion part of the sealing member, and continuing the application of the sealing material along the display region to form the main portion of the sealing member.

The LCD cell obtained through above-mentioned method comprises a pair of substrates, a liquid crystal layer sandwiched between the pair of substrates and a sealing member disposed between and at the periphery of the pair of substrates for fixing one of the substrates to the other, wherein the sealing member has a main portion enclosing a display region and a protrusion part extending from the main portion. Besides, the present invention also provides a liquid crystal display device having the LCD cell.

The present method for manufacturing LCD cells can keep the initial end of a sealing member, which is generally formed by a great amount of sealing material, away from the display region and thus more accurately control the width of the sealing member especially in the overlapping area of the sealing member and a light-shielding matrix such that the sealing member is not overlapped with the light-shielding matrix. Since the width of the sealing member can be accurately controlled, the formed sealing member can avoid overlapping with the light-shielding matrix without keeping a larger distance between the sealing member and the part of the light-shielding matrix that causes a light-blocking effect.

BRIEF DESCRIPTION OF THE DRAWINGS

Other objects, advantages, and novel features of the invention will become more apparent from the following detailed description when taken in conjunction with the accompanying drawings.

DESCRIPTION OF THE PREFERRED EMBODIMENT

Figure 1:
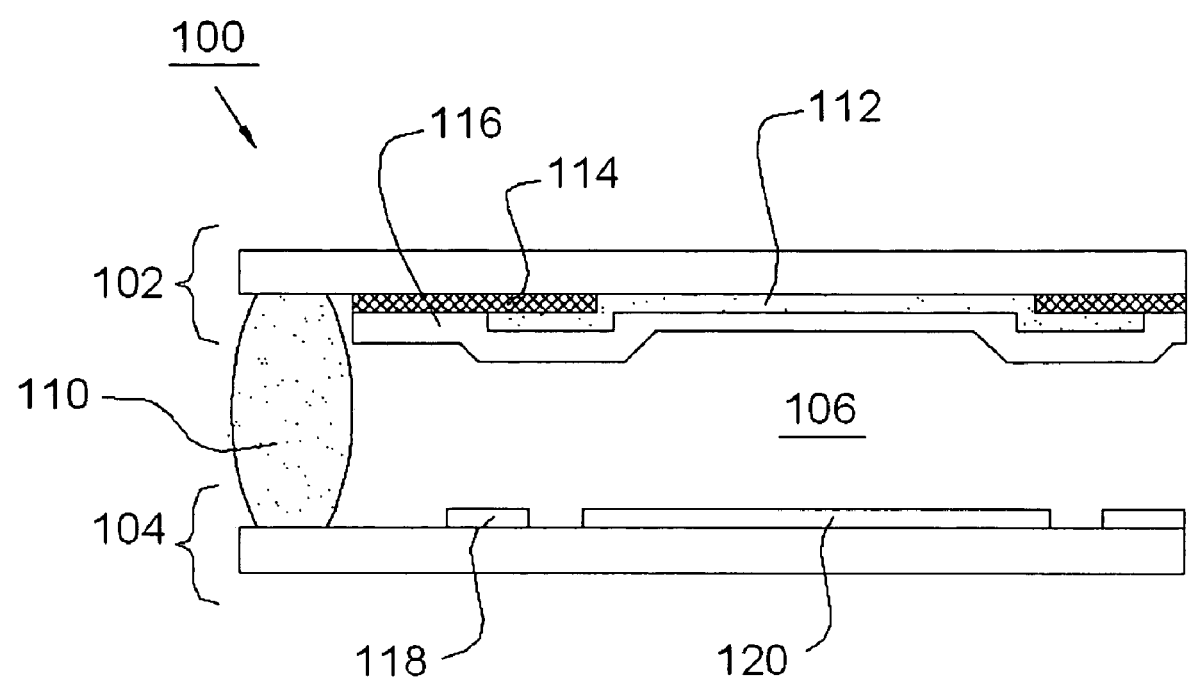
FIG. 1 is a partially sectional view of a liquid crystal display cell according to one embodiment of the present invention.
Figure 4:
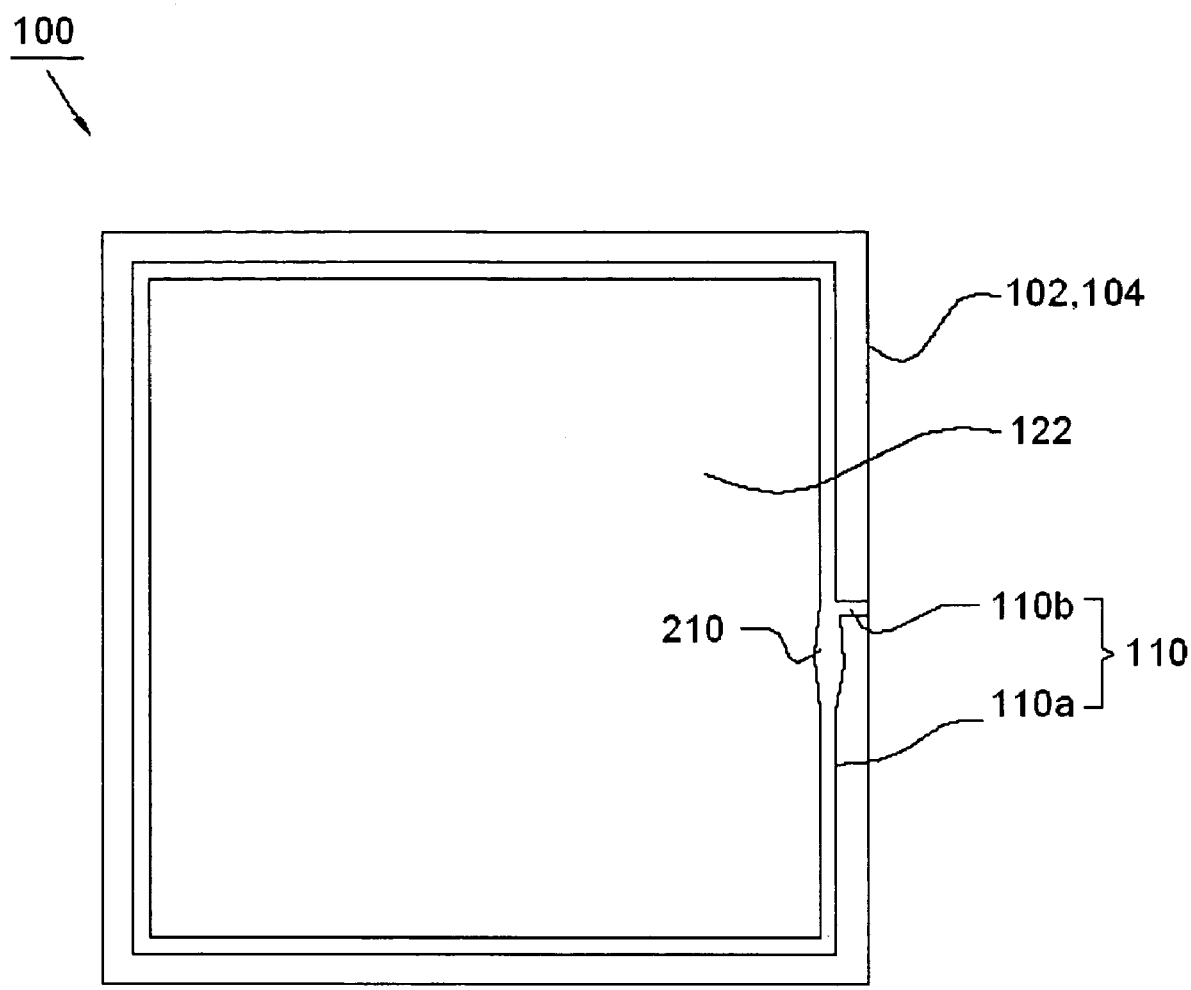

FIGS. 1 and 4 illustrate a liquid crystal display (LCD) cell 100 according to one embodiment of the present invention. Referring to FIG. 1, the LCD cell 100 includes a substrate 102, a substrate 104, a liquid crystal layer 106 sandwiched between the two substrates 102, 104 and a sealing member 110 (see FIG. 4) for sealing the liquid crystal layer 106. The liquid crystal layer 106 of the LCD cell 100 is formed by a one drop fill (ODF) method.

Referring to FIG. 1, the substrate 102 is a color filter (CF) substrate which is provided with a plurality of color filter areas 112 (only one is shown in FIG. 1), a light-shielding matrix 114 disposed between two adjacent color filter areas 112 and a transparent electrode 116 substantially coving the whole surface of the substrate 102. The substrate 104 is a thin film transistor (TFT) substrate which is provided with a plurality of parallel data lines (not shown), a plurality of parallel gate lines (not shown), a plurality of thin film transistors 118 each disposed at the intersection of each data line and each gate line and a plurality of pixel electrodes each disposed at the area defined by two adjacent gate lines and two adjacent data lines and opposite to each color filter area 112 of substrate 102. The LCD cell 100 has a display region 122 (see FIG. 4) such that the pixel electrodes 120 and the color filter areas 112 are substantially arranged within the display region 122.

Referring to FIG. 4, the sealing member 110 is disposed between and at the periphery of the substrate 102, 104 for fixing the substrate 102 to the substrate 104 and sealing the liquid crystal layer 106. The sealing member 110 has a main portion 110a enclosing the display region 122 and a protrusion part 110b extending from the main portion 110a wherein the liquid crystal layer 106 is formed within the display region 122 enclosed by the main portion 110a. The main portion 110a, for example, is a sealing element that is rectangular in shape or at least has four side walls.

It should be understood that the pair of substrates of the LCD cell can also be a color filter on array (COA) substrate and a counter substrate having a common electrode respectively. Besides, the pair of substrates of the LCD cell can also be an in-plane switching mode TFT substrate and a counter substrate.

Figure 2:
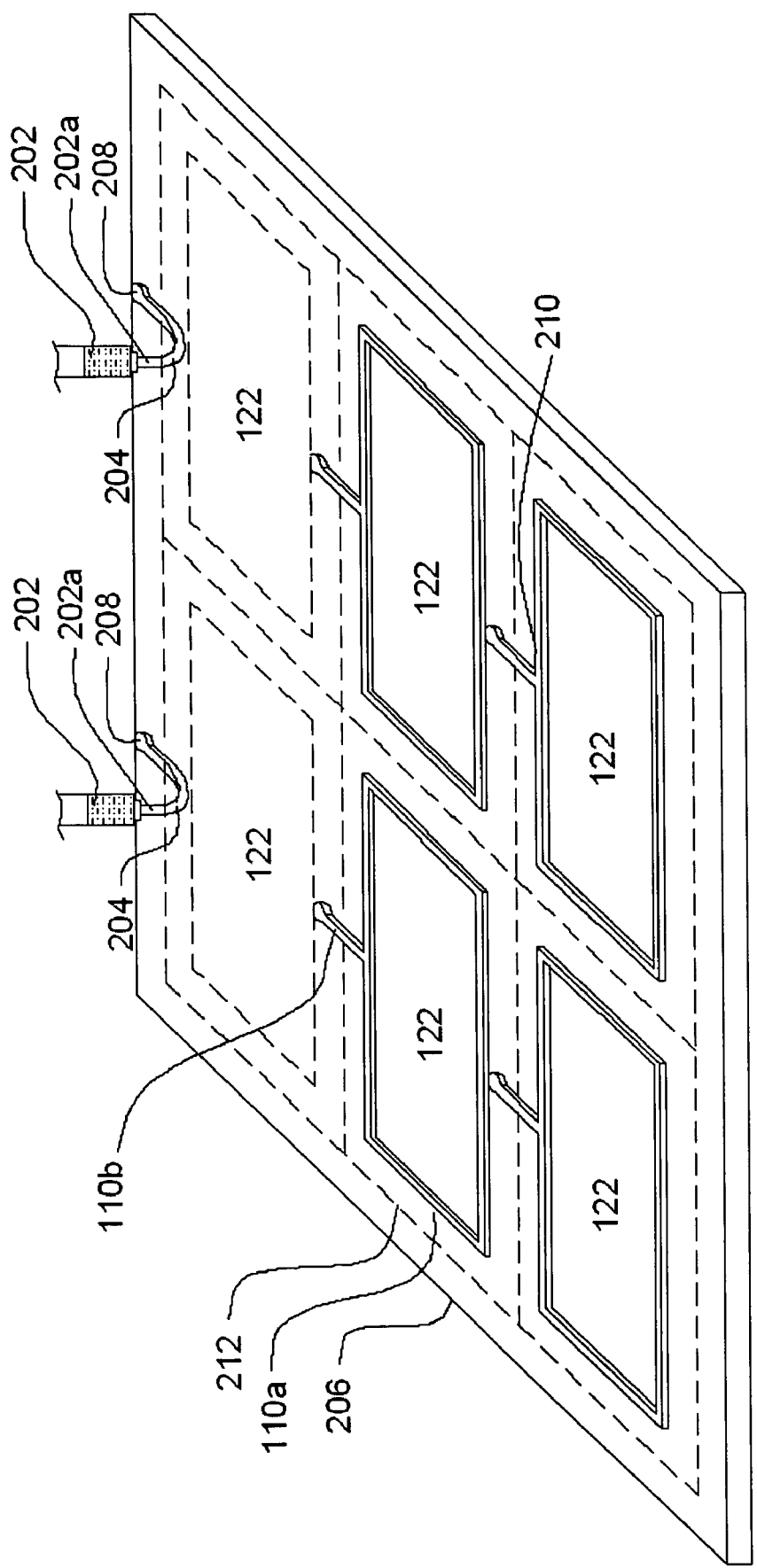
FIGS. 2 to 4 illustrate the main steps of method for manufacturing liquid crystal display cells according to one embodiment of the present invention.
Figure 3:
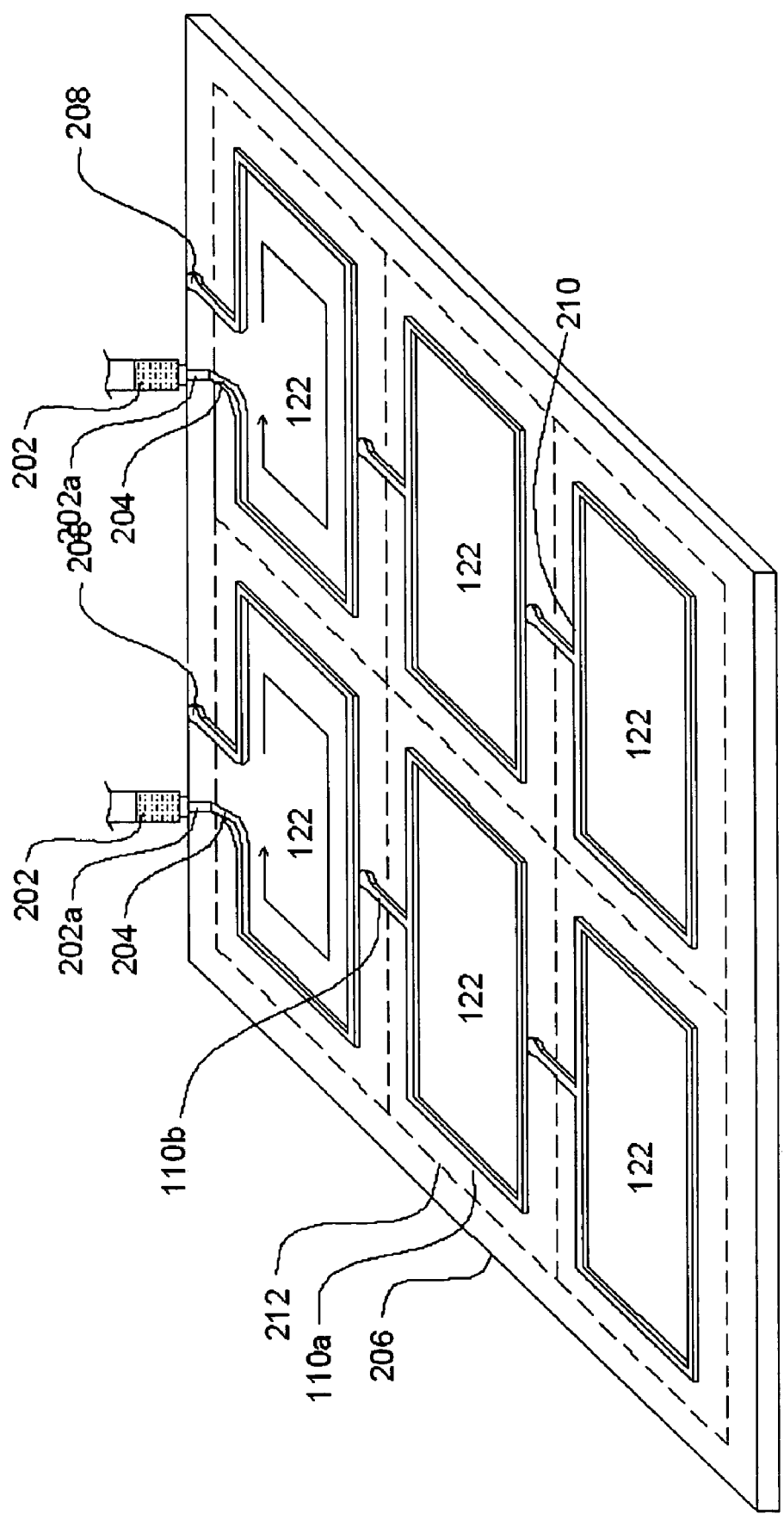

Referring to FIGS. 2 to 4, the sealing member 110 is formed by following steps. Referring to FIGS. 2 and 3, first, an injector 202 is used to dispense a sealing material (or sealant) 204 on a glass substrate 206. It should be understood that a large glass substrate 206 can be used for manufacturing more than one LCD cells 100 at the same time in order to improve manufacturing efficiencies. The injector 202 has a needle 202a, and the sealing material 204 contained within the injector 202 is squeezed out through the needle 202a by pressurizing a gas (e.g. Nitrogen) and then applied on the glass substrate 206. Since the sealing material 204 is squeezed by gas pressure, the applied amount of the sealing material 204 is not easily controlled such that the initial end 208 of the sealing member 110 is not uniform in size. More specifically, since the gas pressure at the beginning should be increased till a level greater than that which can start applying the sealing material 204, the applied amount of the sealing material 204 at the initial end 208 is uncontrollably over-applied. Therefore, the present invention provides a novel applying method. Referring to FIG. 2, the needle 202a of the injector 202 is set to a position outside the display region 122 for starting to apply the sealing material 204, and then the sealing material 204 is applied toward the display region 122 to form the protrusion part 110b of the sealing member 110. Referring to FIG. 3, the sealing material 204 is then continued being applied along the display region 122 according to the arrow direction till forming a small overlapping area 210, thereby enclosing the display region 122 and thus forming the main portion 110a of the sealing member 110. Preferably, the main portion 110a and the protrusion part 110b of the sealing member 110 are formed at a time. Accordingly, the initial end 208 of the sealing material 204 can be kept away from the display region 122 such that the width and volume of the sealing member, especially the overlapping area 210, can be more accurately controlled and the formed sealing member 110 is not overlapped with the light-shielding matrix 114 (see FIG. 1).

In the next step, a liquid crystal material is dispensed upon the glass substrate 206. Then, the other glass substrate (not shown) is superposed upon the glass substrate 206. In this stage, the liquid crystal material is enclosed by the main portion 110a of the sealing member 110 so as to form the liquid crystal layer 106.

After curing the sealing member 110 for fixing the substrate 206 to the other substrate (not shown), the pair of substrates is cut along a cutting line 212 (see FIG. 3). It should be noted that the cutting line 212 is preset outside the display region 122 and selectively across the protrusion part 110b of the sealing member 110. After the cutting step, a plurality of LCD cells 100 (see FIG. 4) can be obtained. It should be understood that the substrate 102 or substrate 104 can be one of plurality of substrates on a pair of mother glasses.

It should be noted that, in the present method, a pure thermosetting sealant can not be used in the step of dispensing the liquid crystal material before the two substrates are sealed. Accordingly, the sealing material for forming the sealing member 110 is preferably a radiation-curable adhesive (e.g. an ultraviolet-curable adhesive).

Figure 5:
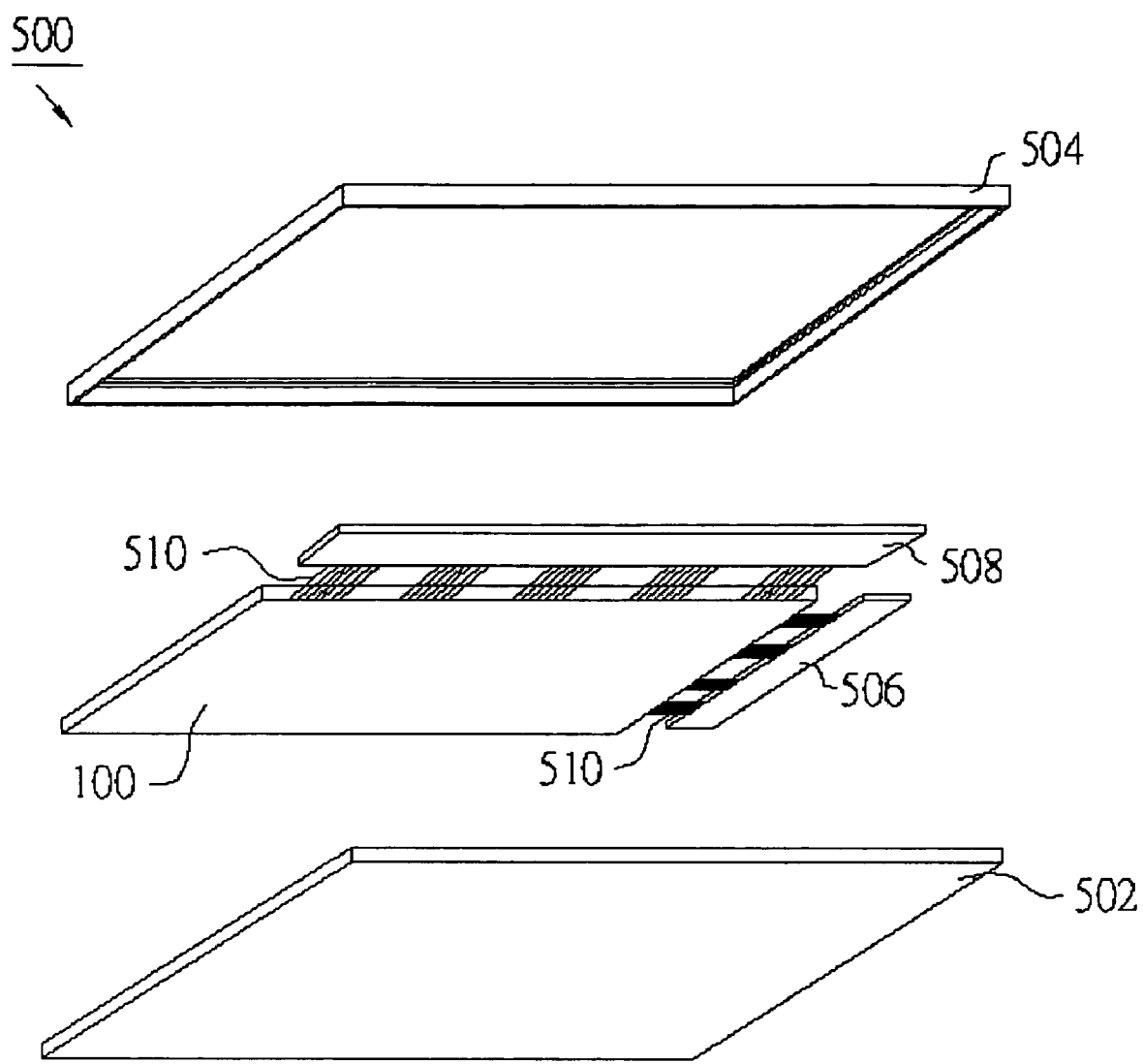
FIG. 5 is an exploded view of a liquid crystal display device according to one embodiment of the present invention.

The LCD cell provided by the present invention can be used in a LCD device as shown in FIG. 5. The LCD device 500 includes the LCD cell 100, a light source (backlight device) 502 disposed under the LCD cell 100 for illuminating the LCD cell 100 and a frame 504 connecting to the backlight device 502, thereby assembling the LCD cell 100 and the backlight device 502 together to form the LCD device 500. The LCD device 500 further includes two printed circuit boards 506 and 508 which transmit control and driving signals to the LCD cell 100 through tape carrier packages (TCP) 510.

The method for manufacturing LCD cells provided by the present invention can utilize ODF method with low cost and time saving to form the liquid crystal layer and also can accurately control the width of the sealing member especially in the overlapping area of the sealing member and the light-shielding matrix. Therefore, the formed sealing member can surely avoid overlapping with the light-shielding matrix without keeping a larger distance between the sealing member and the part of the light-shielding matrix that causes a light-blocking effect.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for manufacturing a liquid crystal display cell comprising the following steps:
   forming a sealing member having a main portion enclosing a display region and a protrusion part extending from the main portion wherein the sealing member is formed by the following steps:
      applying a sealing material to either one of a pair of substrates from a position outside of the display region toward the display region to form the protrusion part of the sealing member; and
      continuing applying the sealing material along the display region to form the main portion of the sealing member, wherein positions of an initial end and an overlapping area within the sealing member are different and the overlapping area extends along one side of the display region;
   dispensing a liquid crystal material upon one of the pair of substrates;
   superposing one of the pair of substrates upon the other one such that the liquid crystal material is enclosed by the sealing member;
   curing the sealing member;
   cutting the pair of substrates to obtain the liquid crystal display cell.

2. The method for manufacturing a liquid crystal display cell according to claim 1, wherein the sealing material is a radiation-curable adhesive.

3. The method for manufacturing a liquid crystal display cell according to claim 1, wherein one of the pair of substrates has a light-shielding matrix, and the sealing member is not overlapped with a vertical projected area of the light-shielding matrix.

4. The method for manufacturing a liquid crystal display cell according to claim 1, wherein the cutting step proceeds along a cutting line of the pair of substrates, and the cutting line is across the protrusion part of the sealing member.

5. A liquid crystal display cell comprising:
   a first substrate;
   a second substrate;
   a liquid crystal layer sandwiched between the first substrate and the second substrate; and
   a sealing member disposed between the first and second substrates for fixing the first substrate to the second substrate, wherein the sealing member has a main portion enclosing a display region and a protrusion part extending from the main portion and the sealing member is formed by the following steps:
      applying a sealing material to either one of a pair of substrates from a position outside of the display region toward the display region to form the protrusion part of the sealing member; and
      continuing applying the sealing material along the display region to form the main portion of the sealing member after forming the protrusion part, wherein positions of an initial end and an overlapping area within the sealing member are different and the overlapping area extends along one side of the display region.

6. The liquid crystal display cell according to claim 5, wherein the sealing material is a radiation-curable adhesive.

7. The liquid crystal display cell according to claim 5, wherein the first substrate has a light-shielding matrix, and the sealing member is not overlapped with a vertical projected area of the light-shielding matrix.

8. A liquid crystal display device including at least a backlight module and a liquid crystal display cell, wherein the liquid crystal display cell comprises:
   a first substrate;
   a second substrate;
   a liquid crystal layer sandwiched between the first substrate and the second substrate; and
   a sealing member disposed between the first and second substrates for fixing the first substrate to the second substrate, wherein the sealing member has a main portion enclosing a display region and a protrusion part extending from the main portion and the sealing member is formed by the following steps:
      applying a sealing material to either one of a pair of substrates from a position outside of the display region toward the display region to form the protrusion part of the sealing member; and
      continuing applying the sealing material along the display region to form the main portion of the sealing member after forming the protrusion part, wherein positions of an initial end and an overlapping area within the sealing member are different and the overlapping area extends along one side of the display region.

9. The liquid crystal display device according to claim 8, wherein the sealing material is a radiation-curable adhesive.

10. The liquid crystal display device according to claim 8, wherein the first substrate has a light-shielding matrix, and the sealing member is not overlapped with a vertical projected area of the light-shielding matrix.

11. A liquid crystal display cell comprising:
   a first substrate;
   a second substrate;
   a sealing member disposed between the first and second substrates for fixing the first substrate to the second substrate, wherein the sealing member has a main portion enclosing a display region and only a protrusion part extending from the main portion, wherein positions of an initial end and an overlapping area within the sealing member are different and the overlapping area extends along one side of the display region; and
   a liquid crystal layer sandwiched between the first substrate and the second substrate and formed within the display region enclosed by the main portion of the sealing member.

12. The liquid crystal display cell according to claim 11, wherein the main portion has at least four side walls.

13. The liquid crystal display cell according to claim 12, wherein the main portion is rectangular in shape.

14. The liquid crystal display cell according to claim 11, wherein the first substrate has a light-shielding matrix, and the sealing member is not overlapped with a vertical projected area of the light-shielding matrix.

15. A liquid crystal display device including at least a backlight module and a liquid crystal display cell, wherein the liquid crystal display cell comprises:

a first substrate;

a second substrate;

a sealing member disposed between the first and second substrates for fixing the first substrate to the second substrate, wherein the sealing member has a main portion enclosing a display region and only a protrusion part extending from the main portion, wherein positions of an initial end and an overlapping area within the sealing member are different and the overlapping area extends along one side of the display region; and a liquid crystal layer sandwiched between the first substrate and the second substrate and formed within the display region enclosed by the main portion of the sealing member.

16. The liquid crystal display device according to claim 15, wherein the first substrate has a light-shielding matrix, and the sealing member is not overlapped with a vertical projected area of the light-shielding matrix.

17. The liquid crystal display device according to claim 15, wherein the main portion has at least four side walls.

18. The liquid crystal display device according to claim 17, wherein the main portion is rectangular in shape.

19. The liquid crystal display device according to claim 15, wherein the width of the protrusion part is substantially the same width as the main portion enclosing the display region.

* * * * *